(12) United States Patent
Abe

(10) Patent No.: US 12,261,738 B2
(45) Date of Patent: Mar. 25, 2025

(54) COMMUNICATION SYSTEM, CONSTRUCTION METHOD, AND RECORDING MEDIUM

(71) Applicant: NEC Corporation, Tokyo (JP)

(72) Inventor: Satoki Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/216,855

(22) Filed: Jun. 30, 2023

(65) Prior Publication Data

US 2024/0015063 A1 Jan. 11, 2024

(30) Foreign Application Priority Data

Jul. 8, 2022 (JP) .................... 2022-110168

(51) Int. Cl.
*G06F 15/173* (2006.01)
*H04L 12/46* (2006.01)
*H04L 41/0803* (2022.01)

(52) U.S. Cl.
CPC ...... *H04L 41/0803* (2013.01); *H04L 12/4641* (2013.01)

(58) Field of Classification Search
None
See application file for complete search history.

(56) References Cited

U.S. PATENT DOCUMENTS

2021/0389968 A1* 12/2021 Majewski .............. G06F 9/541
2022/0038554 A1*  2/2022 Merwaday ............. H04L 45/64

FOREIGN PATENT DOCUMENTS

| JP | 2019-040327 A | 3/2019 |
| JP | 2020-074656 A | 5/2020 |
| JP | 2021-087190 A | 6/2021 |

* cited by examiner

*Primary Examiner* — Benjamin M Thieu
*Assistant Examiner* — Andrew Woo

(57) ABSTRACT

An on-premise-side construction device transmits on-premise-side setting information for a cloud device to communicate with an on-premise device, to a cloud-side construction device via the Internet, receives cloud-side setting information for the on-premise device to communicate with the cloud device from the cloud-side construction device, and sets the cloud-side setting information in the on-premise device. The cloud-side construction device transmits the cloud-side setting information to the on-premise-side construction device via the Internet, receives the on-premise-side setting information from the on-premise-side construction device, and sets the on-premise-side setting information in the cloud device.

10 Claims, 13 Drawing Sheets

COMMUNICATION SYSTEM, CONSTRUCTION METHOD, AND RECORDING MEDIUM

This application is based upon and claims the benefit of priority from Japanese Patent Application No. 2022-110168, filed on Jul. 8, 2022, the disclosure of which is incorporated herein in its entirety by reference.

TECHNICAL FIELD

The present invention relates to a communication system and the like.

BACKGROUND ART

A 5th generation (5G) mobile communication system has been expected as a technique for digital transformation (DX) acceleration from a society and a company. Particularly, local 5G that can be uniquely used by a company, a local government, and the like has a system being developed and has many demonstration experiments being performed.

As a construction method for a local 5G network, a method of placing a control plane (C-Plane: control-plane) device of a 5G core network (5GC) in a cloud environment is conceivable. In this method, an entrepreneur trying to use the local 5G adds a radio access network (RAN) and a user plane (U-Plane: user-plane) device (user plane function (UPF)) to an on-premise environment of the entrepreneur. The C-Plane device can be operated by an operator different from the entrepreneur. In this method, the entrepreneur can use the local 5G by adding the RAN and the UPF to the on-premise environment. Thus, the entrepreneur can reduce a burden on introduction and operation of the local 5G.

Further, as a related art, there are techniques described in PTL 1 (Japanese Unexamined Patent Application Publication No. 2020-074656), PTL 2 (Japanese Unexamined Patent Application Publication No. 2021-087190), and PTL 3 (Japanese Unexamined Patent Application Publication No. 2019-040327).

However, when the RAN and the UPF are added to the on-premise environment, the C-Plane device in the cloud environment needs to be constructed according to an Internet protocol (IP) network configuration in the on-premise environment.

This is specifically described. The UPF and a session management function (SMF) of the C-Plane are connected by a packet forwarding control protocol (PFCP). Further, the RAN and an access and mobility management function (AMF) of the C-Plane are connected by a stream control transmission protocol (SCTP). The PFCP and the SCTP are communication methods of establishing a virtual special communication path (association) between devices. The PFCP and the SCTP perform transmission/reception of data via the special communication path.

In order to establish an association, devices that perform communication need to recognize mutual IP addresses. Thus, when the RAN and the UPF are constructed according to the IP network configuration in the on-premise environment, the AMF in the cloud environment needs to recognize an IP address of the RAN constructed according to the IP network configuration in the on-premise environment. Further, the SMF in the cloud environment needs to recognize an IP address of the UPF constructed according to the IP network configuration in the on-premise environment.

In other words, when the RAN and the UPF are constructed according to the IP network configuration in the on-premise environment, the C-Plane device in the cloud environment also needs to be constructed according to the IP network configuration in the on-premise environment. Then, the operator of the C-Plane device constructs the cloud environment for each entrepreneur trying to use the local 5G. As a result, the operator of the C-Plane device needs time and effort for constructing the cloud environment. Thus, the operator of the C-Plane device cannot quickly provide a local 5G service.

SUMMARY

An object of the present invention is, in view of the problem described above, to provide a communication system and the like that allow construction of a cloud environment according to an on-premise environment to be quickly performed when a communication device is placed in the cloud environment and the on-premise environment.

A communication system according to one aspect of the present invention includes: a cloud-side construction device included in a cloud environment including a cloud device; and an on-premise-side construction device included in an on-premise environment including an on-premise device, and connected to the cloud-side construction device via the Internet, wherein the cloud device and the on-premise device are communication devices constituting a core network, the on-premise-side construction device includes a first transmission unit that transmits on-premise-side setting information for the cloud device to communicate with the on-premise device, to the cloud-side construction device via the Internet, a first reception unit that receives cloud-side setting information for the on-premise device to communicate with the cloud device, from the cloud-side construction device, and a first setting unit that sets the cloud-side setting information in the on-premise device, and the cloud-side construction device includes a second transmission unit that transmits the cloud-side setting information to the on-premise-side construction device via the Internet, a second reception unit that receives the on-premise-side setting information from the on-premise-side construction device, and a second setting unit that sets the on-premise-side setting information in the cloud device.

Further, a construction method according to another aspect of the present invention includes, in a communication system including a cloud-side construction device included in a cloud environment including a cloud device, and an on-premise-side construction device included in an on-premise environment including an on-premise device, and connected to the cloud-side construction device via the Internet, the cloud device and the on-premise device being communication devices constituting a core network: transmitting, by the on-premise-side construction device, on-premise-side setting information for the cloud device to communicate with the on-premise device, to the cloud-side construction device via the Internet; receiving, by the cloud-side construction device, the on-premise-side setting information from the on-premise-side construction device; setting, by the cloud-side construction device, the on-premise-side setting information in the cloud device; transmitting, by the cloud-side construction device, cloud-side setting information for the on-premise device to communicate with the cloud device, to the on-premise-side construction device via the Internet; receiving, by the on-premise-side construction device, the cloud-side setting information from the cloud-side construction device; and setting, by the on-premise-side construction device, the cloud-side setting information in the on-premise device.

Further, a construction program recorded in a non-transitory computer-readable recording medium according to another aspect of the present invention causes a computer to achieve, in a communication system including a cloud-side construction device included in a cloud environment including a cloud device, and an on-premise-side construction device included in an on-premise environment including an on-premise device, and connected to the cloud-side construction device via an Internet, the cloud device and the on-premise device being communication devices constituting a core network: a first transmission function of transmitting, by the on-premise-side construction device, on-premise-side setting information for the cloud device to communicate with the on-premise device, to the cloud-side construction device via the Internet; a second reception function of receiving, by the cloud-side construction device, the on-premise-side setting information from the on-premise-side construction device; a second setting function of setting, by the cloud-side construction device, the on-premise-side setting information in the cloud device; a second transmission function of transmitting, by the cloud-side construction device, cloud-side setting information for the on-premise device to communicate with the cloud device, to the on-premise-side construction device via the Internet; a first reception function of receiving, by the on-premise-side construction device, the cloud-side setting information from the cloud-side construction device; and a first setting function of setting, by the on-premise-side construction device, the cloud-side setting information in the on-premise device.

BRIEF DESCRIPTION OF THE DRAWINGS

Exemplary features and advantages of the present invention will become apparent from the following detailed description when taken with the accompanying drawings in which.

EXAMPLE EMBODIMENT

First Example Embodiment

A first example embodiment of the present invention will be described.

Figure 1:
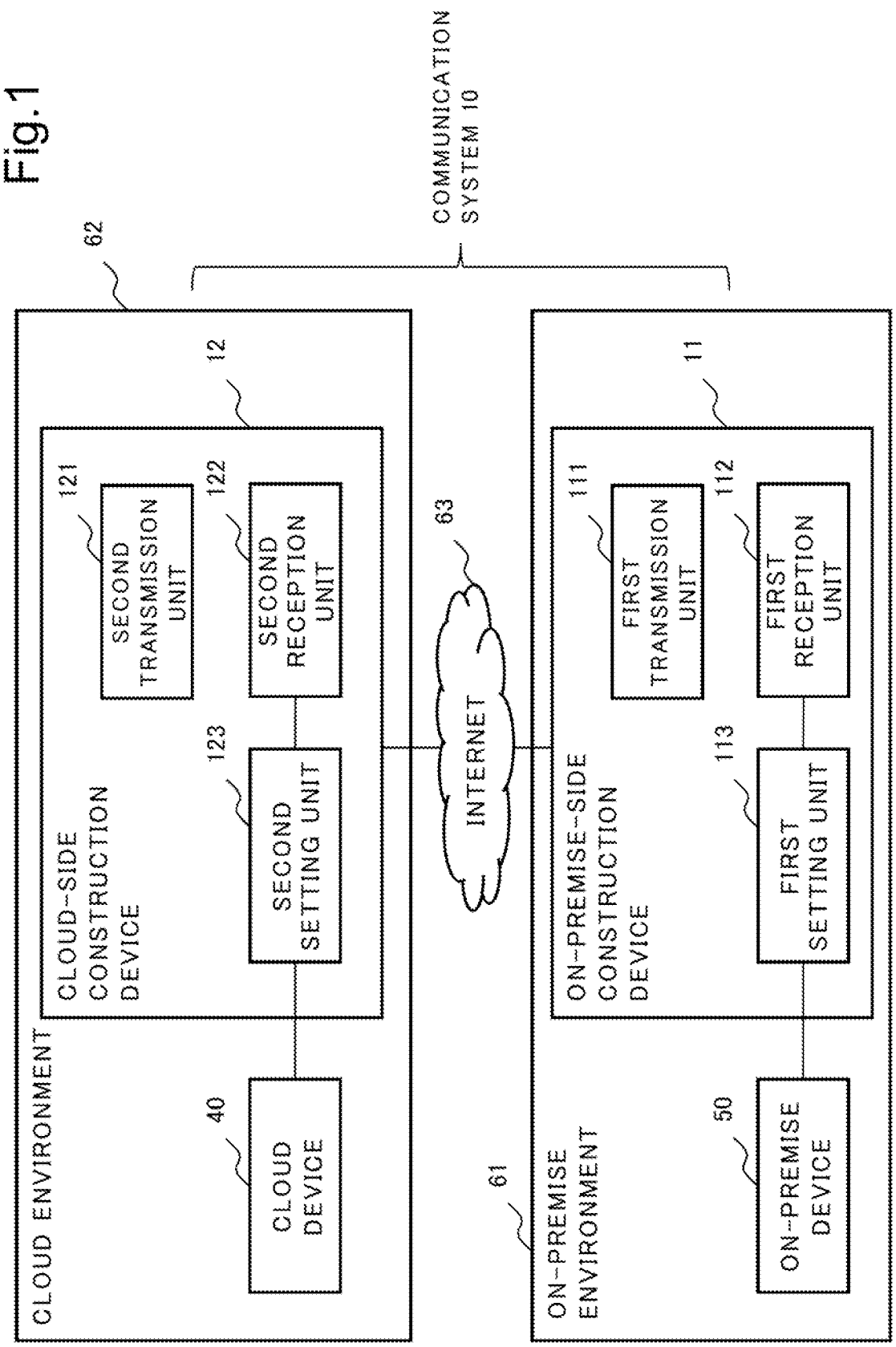
FIG. 1 is a diagram illustrating a configuration example of a communication system according to a first example embodiment of the present invention.

FIG. 1 illustrates a configuration example of a communication system 10 according to the present example embodiment. The communication system 10 includes a cloud-side construction device 12 and an on-premise-side construction device 11.

The cloud-side construction device 12 is included in a cloud environment 62. The cloud environment 62 includes a cloud device 40. The on-premise-side construction device 11 is included in an on-premise environment 61. The on-premise environment 61 includes an on-premise device 50.

The cloud device 40 and the on-premise device 50 are communication devices constituting a core network. The cloud-side construction device 12 and the on-premise-side construction device 11 are connected to each other via an Internet 63.

The on-premise-side construction device 11 includes a first transmission unit 111, a first reception unit 112, and a first setting unit 113. The first transmission unit 111 transmits on-premise-side setting information to the cloud-side construction device 12 via the Internet 63. The on-premise-side setting information is information for the cloud device 40 to communicate with the on-premise device 50. The first reception unit 112 receives cloud-side setting information from the cloud-side construction device 12. The cloud-side setting information is information for the on-premise device 50 to communicate with the cloud device 40. The first setting unit 113 sets the cloud-side setting information in the on-premise device 50.

The cloud-side construction device 12 includes a second transmission unit 121, a second reception unit 122, and a second setting unit 123. The second transmission unit 121 transmits the cloud-side setting information to the on-premise-side construction device 11 via the Internet 63. The second reception unit 122 receives the on-premise-side setting information from the on-premise-side construction device 11. The second setting unit 123 sets the on-premise-side setting information in the cloud device 40.

Figure 2:
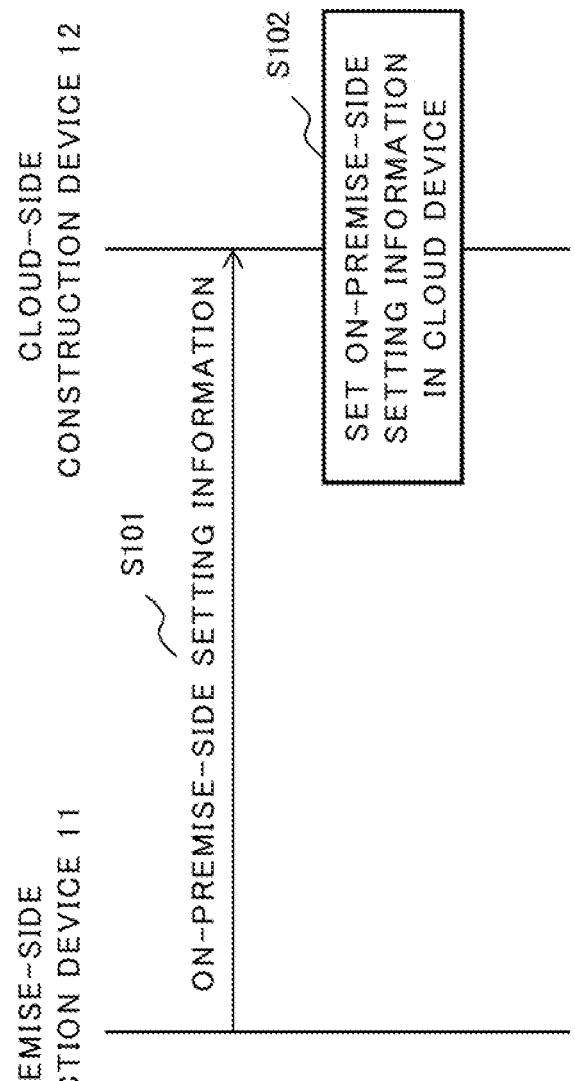
FIG. 2 is a diagram illustrating an example of an operation flow of the communication system according to the first example embodiment of the present invention.
Figure 3:
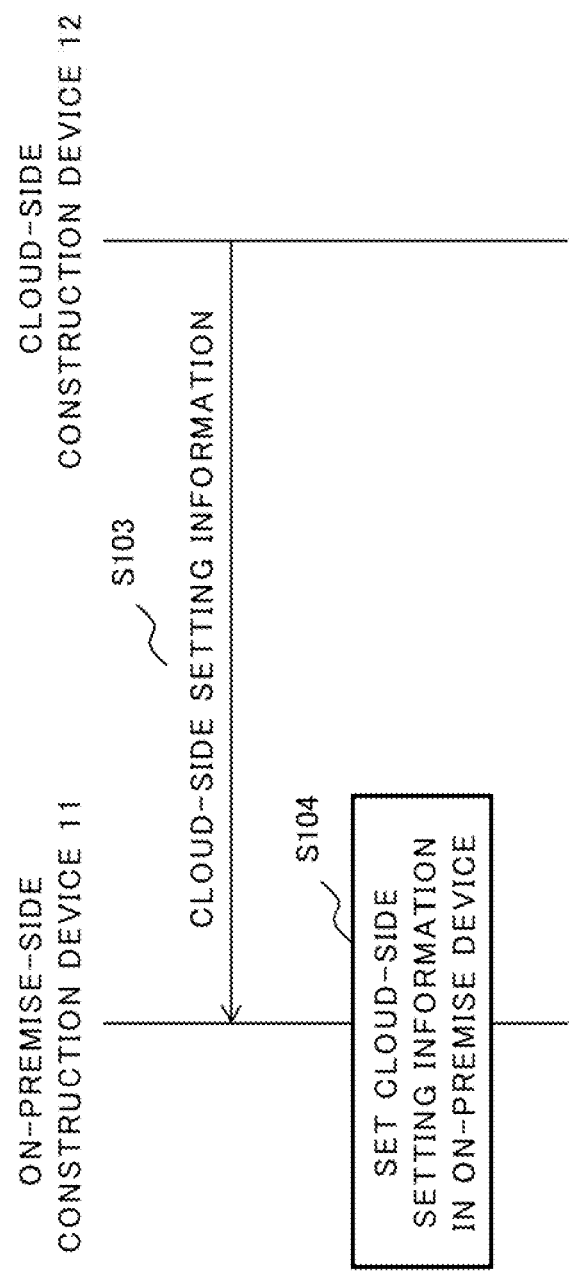
FIG. 3 is a diagram illustrating an example of an operation flow of the communication system according to the first example embodiment of the present invention.

Next, FIGS. 2 and 3 illustrate an example of an operation flow of the communication system 10 according to the present example embodiment. FIG. 2 is an example of an operation flow of the on-premise-side setting information. FIG. 3 is an example of an operation flow of the cloud-side setting information.

The first transmission unit 111 of the on-premise-side construction device 11 transmits the on-premise-side setting information to the cloud-side construction device 12 via the Internet 63. The second reception unit 122 of the cloud-side construction device 12 receives the on-premise-side setting information from the on-premise-side construction device 11 (step S101 in FIG. 2). The second setting unit 123 sets the on-premise-side setting information in the cloud device 40 (step S102).

The second transmission unit 121 of the cloud-side construction device 12 transmits the cloud-side setting information to the on-premise-side construction device 11 via the Internet 63. The first reception unit 112 of the on-premise-side construction device 11 receives the cloud-side setting information from the cloud-side construction device 12 (step S103 in FIG. 3). The first setting unit 113 sets the cloud-side setting information in the on-premise device 50 (step S104).

As described above, in the first example embodiment of the present invention, the communication system 10 includes the on-premise-side construction device 11 and the cloud-side construction device 12. The cloud-side construction device 12 is included in the cloud environment 62. The cloud environment 62 includes the cloud device 40. The on-premise-side construction device 11 is included in the on-premise environment 61. The on-premise environment 61 includes the on-premise device 50. The cloud device 40 and the on-premise device 50 are communication devices constituting a core network. The cloud-side construction device 12 and the on-premise-side construction device 11 are connected to each other via the Internet 63. The on-premise-side construction device 11 includes the first transmission unit 111, the first reception unit 112, and the first setting unit 113. The first transmission unit 111 transmits on-premise-side setting information to the cloud-side construction device 12. The on-premise-side setting information is information for the cloud device 40 to communicate with the on-premise device 50. The first reception unit 112 receives cloud-side setting information from the cloud-side construction device 12. The cloud-side setting information is information for the on-premise device 50 to communicate with the cloud device 40. The first setting unit 113 sets the cloud-side setting information in the on-premise device 50. The cloud-side construction device 12 includes the second transmission unit 121, the second reception unit 122, and the second setting unit 123. The second transmission unit 121 transmits the cloud-side setting information to the on-premise-side construction device 11. The second reception unit 122 receives the on-premise-side setting information from the on-premise-side construction device 11. The second setting unit 123 sets the on-premise-side setting information in the cloud device 40.

In this way, in the communication system 10, the on-premise-side construction device 11 and the cloud-side construction device 12 are connected to each other via the Internet. Then, the on-premise-side construction device 11 transmits on-premise-side setting information to the cloud-side construction device 12, and the cloud-side construction device 12 sets the on-premise-side setting information in the cloud device 40. Further, the cloud-side construction device 12 transmits cloud-side setting information to the on-premise-side construction device 11, and the on-premise-side construction device 11 sets the cloud-side setting information in the on-premise device 50. The on-premise-side setting information is set in the cloud device 40, and thus a cloud environment is constructed. Thus, when a communication device is placed in the cloud environment and an on-premise environment, construction of the cloud environment according to the on-premise environment can be quickly performed.

Second Example Embodiment

Next, a second example embodiment of the present invention will be described. In the present example embodiment, a communication system 10 will be more specifically described.

First, a configuration example of the communication system 10 according to the present example embodiment will be described by using FIG. 1. The communication system 10 according to the present example embodiment includes an on-premise-side construction device 11 and a cloud-side construction device 12.

The cloud-side construction device 12 is included in a cloud environment 62. The cloud environment 62 includes a cloud device 40. The on-premise-side construction device 11 is included in an on-premise environment 61. The on-premise environment 61 includes an on-premise device 50.

The cloud device 40 and the on-premise device 50 are communication devices constituting a core network. The cloud-side construction device 12 and the on-premise-side construction device 11 are connected to each other via an Internet 63.

The core network is, for example, a core network of local 5G. The on-premise environment 61 is operated by, for example, an entrepreneur to use the local 5G. Hereinafter, the entrepreneur to use the local 5G may be simply referred to as an entrepreneur. Further, the cloud environment 62 is operated by, for example, an operator who operates a C-Plane device of the core network. Hereinafter, the operator who operates the C-Plane device may be simply referred to as an operator.

Note that, in the present example embodiment, a U-Plane is constructed in the on-premise environment 61, and a C-Plane is constructed in the cloud environment 62. The on-premise device 50 is a device of the U-Plane, and the cloud device 40 is a device of the C-Plane.

Figure 4:
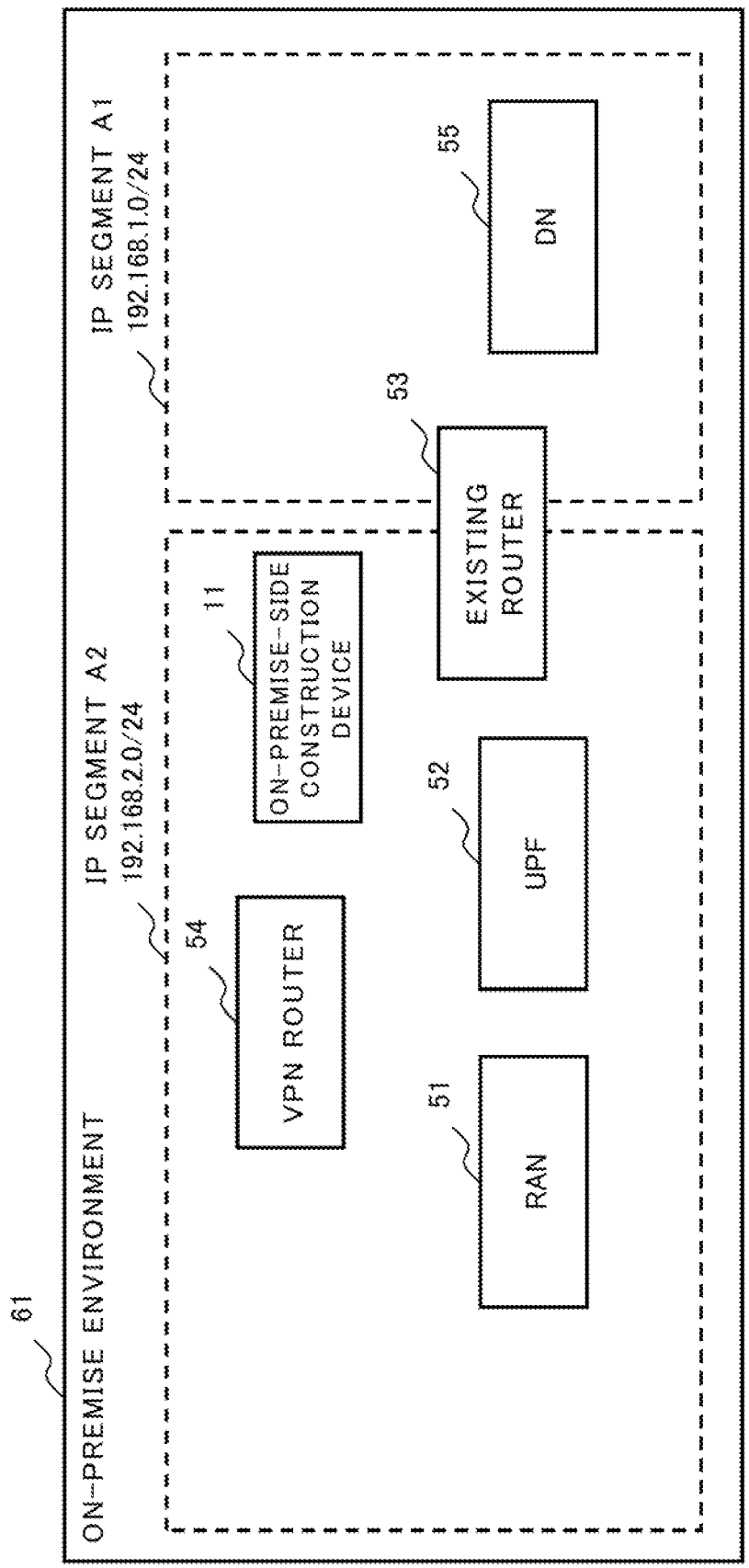
FIG. 4 is a diagram illustrating a configuration example of an on-premise environment according to a second example embodiment of the present invention.

First, FIG. 4 illustrates a configuration example of the on-premise environment 61 according to the present example embodiment.

The on-premise environment 61 includes a data network (DN) 55. The DN 55 is an existing operation system being operated by an entrepreneur. The core network constructed in the present example embodiment allows user equipment (UE) (not illustrated) to be connected to the DN 55. The UE is connected to the DN 55 via a RAN 51 and a UPF 52.

Further, the on-premise environment 61 includes the RAN 51, the UPF 52, and a virtual private network (VPN) router 54. The RAN 51, the UPF 52, and the VPN router 54 correspond to the on-premise device 50 illustrated in FIG. 1. The RAN 51 is a RAN in the core network. The UPF 52 is a UPF in the core network. The VPN router 54 is a router having a VPN connection function. The VPN router 54 can communicate with a VPN router 47 in the cloud environment 62 by processing performed by the on-premise-side construction device 11 and the cloud-side construction device 12. The processing will be described below.

Further, the on-premise environment 61 includes the on-premise-side construction device 11. The on-premise-side construction device 11 will be described below.

Further, the on-premise-side construction device 11, the RAN 51, the UPF 52, and the VPN router 54 are connected to an IP segment A2. The IP segment A2 is, for example, 192.168.2.0/24. Further, the DN 55 is connected to an IP segment A1. The IP segment A1 is, for example, 192.168.1.0/24. Further, an existing router 53 is connected to the IP segment A1 and the IP segment A2. The on-premise-side construction device 11 is connected to the IP segment A2 and the Internet. A public IP address is assigned to the on-premise-side construction device 11.

Figure 5:
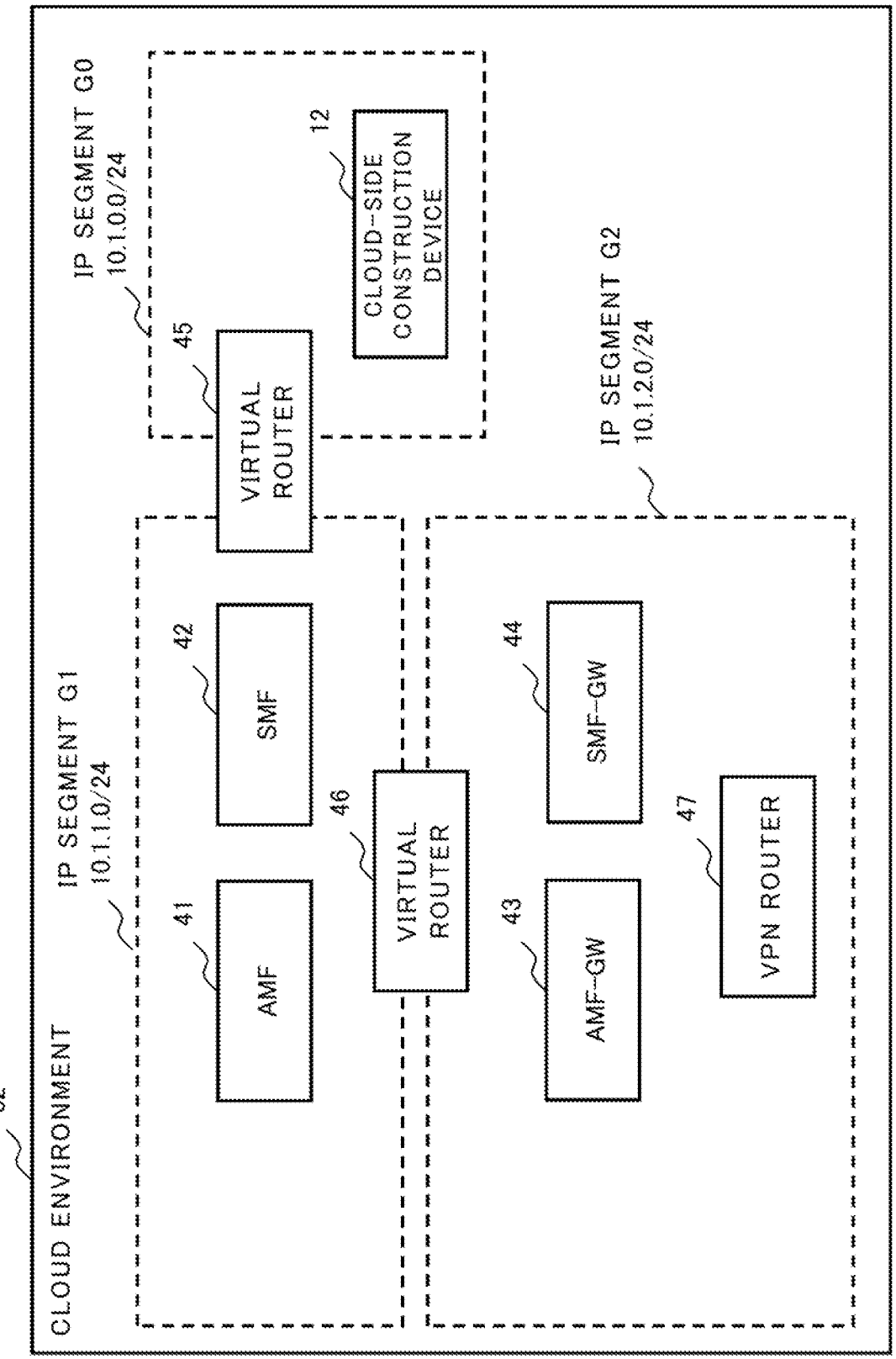
FIG. 5 is a diagram illustrating a configuration example of a cloud environment according to the second example embodiment of the present invention.

Next, FIG. 5 illustrates a configuration example of the cloud environment 62 according to the present example embodiment.

The cloud environment 62 includes an AMF 41, an SMF 42, and the VPN router 47. The AMF 41 is an AMF in the core network. The SMF 42 is an SMF in the core network. The VPN router 47 is a router having a VPN connection function. The AMF 41, the SMF 42, and the VPN router 47 correspond to the cloud device 40 in FIG. 1. Further, the VPN router 47 can communicate with the VPN router 54 in the on-premise environment 61 by processing performed by the on-premise-side construction device 11 and the cloud-side construction device 12. The processing will be described below.

Further, the cloud environment 62 includes an AMF-gateway (GW) 43 and an SMF-GW 44. The AMF-GW 43 is a gateway that connects the AMF 41 and the RAN 51. The AMF-GW 43 connects the AMF 41 and the RAN 51 via a virtual router 46, the AMF-GW 43, the VPN router 47, and the VPN router 54. The SMF-GW 44 is a gateway that connects the SMF 42 and the UPF 52. The SMF-GW 44 connects the SMF 42 and the UPF 52 via the virtual router 46, the SMF-GW 44, the VPN router 47, and the VPN router 54. The AMF-GW 43 and the SMF-GW 44 correspond to the cloud device 40 in FIG. 1.

Note that, in an initial state, the AMF-GW 43 and the SMF-GW 44 are not present. The AMF-GW 43 is generated by processing performed by the on-premise-side construction device 11 and the cloud-side construction device 12, and can communicate with the RAN 51 in the on-premise environment 61. Further, the SMF-GW 44 is generated by processing performed by the on-premise-side construction device 11 and the cloud-side construction device 12, and can communicate with the UPF 52 in the on-premise environment 61. The pieces of processing will be described below.

Further, the cloud environment 62 includes the cloud-side construction device 12. The cloud-side construction device 12 will be described below.

Further, the cloud-side construction device 12 is connected to an IP segment G0. The IP segment G0 is, for example, 10.1.0.0/24. Further, the AMF 41 and the SMF 42 are connected to an IP segment G1. The IP segment G1 is, for example, 10.1.1.0/24. Further, the AMF-GW 43, the SMF-GW 44, and the VPN router 47 are connected to an IP segment G2. The IP segment G2 is, for example, 10.1.2.0/24. An existing router 45 is connected to the IP segment G0 and the IP segment G1. The cloud-side construction device 12 is connected to the IP segment G0 and the Internet. A public IP address is assigned to the cloud-side construction device 12. The existing router 46 is connected to the IP segment G1 and the IP segment G2.

Next, the on-premise-side construction device 11 and the cloud-side construction device 12 will be described.

The on-premise-side construction device 11 includes the first transmission unit 111, the first reception unit 112, and the first setting unit 113. The first transmission unit 111 transmits on-premise-side setting information to the cloud-side construction device 12 via the Internet 63. The on-premise-side setting information is information for the cloud device 40 to communicate with the on-premise device 50. Note that the first transmission unit 111 recognizes an IP address of the cloud-side construction device 12 in advance. The first reception unit 112 receives cloud-side setting information from the cloud-side construction device 12. The cloud-side setting information is information for the on-premise device 50 to communicate with the cloud device 40. The first setting unit 113 sets the cloud-side setting information in the on-premise device 50.

The cloud-side construction device 12 includes the second transmission unit 121, the second reception unit 122, and the second setting unit 123. The second transmission unit 121 transmits the cloud-side setting information to the on-premise-side construction device 11 via the Internet 63. The second reception unit 122 receives the on-premise-side setting information from the on-premise-side construction device 11. The second setting unit 123 sets the on-premise-side setting information in the cloud device 40.

Next, a case where the cloud-side setting information and the on-premise-side setting information are setting information about VPN connection. In this case, the on-premise device 50 is the VPN router 54. Further, the cloud device 40 is the VPN router 47. In this case, the cloud-side setting information is set in the on-premise device 50 and the on-premise-side setting information is set in the cloud device 40, and thus the VPN connection between the VPN router 54 and the VPN router 47 can be established.

In this case, the on-premise-side setting information is information for the VPN router 47 to be connected to the VPN router 54. The on-premise-side setting information is, for example, an IP address of the VPN router 54. The first transmission unit 111 of the on-premise-side construction device 11 can acquire the on-premise-side setting information from the VPN router 54. Further, the first transmission unit 111 transmits the on-premise-side setting information to the cloud-side construction device 12 via the Internet 63.

The second reception unit 122 of the cloud-side construction device 12 receives the on-premise-side setting information. Further, the second setting unit 123 transmits the on-premise-side setting information to the VPN router 47. Then, the VPN router 47 registers the on-premise-side setting information (such as the IP address of the VPN router 54) as a connection destination for the on-premise environment 61.

Further, the cloud-side setting information is information for the VPN router 54 to be connected to the VPN router 47. The cloud-side setting information is, for example, an IP address of the VPN router 47. The second transmission unit 121 of the cloud-side construction device 12 transmits the cloud-side setting information to the on-premise-side construction device 11 via the Internet 63. The second transmission unit 121 can acquire the cloud-side setting information from the VPN router 47.

The first reception unit 112 of the on-premise-side construction device 11 receives the cloud-side setting information. The first setting unit 113 transfers the cloud-side setting information to the VPN router 54. The VPN router 54 registers the cloud-side setting information as a connection destination for the cloud environment 62.

In this way, the VPN router 54 and the VPN router 47 can establish a VPN.

Next, a case where the cloud-side setting information and the on-premise-side setting information are setting information about connection between the UPF 52 and the SMF 42. In this case, the on-premise device 50 is the UPF 52. Further, the cloud device 40 is the SMF 42. In this case, the cloud-side setting information is set in the on-premise device 50 and the on-premise-side setting information is set in the cloud device 40, and thus a PFCP association between the UPF 52 and the SMF 42 can be established.

Note that, in this case, it is assumed that the VPN connection between the VPN router 47 and the VPN router 54 is established.

In this case, the on-premise-side setting information includes address band information of the IP segment A2, and an IP address being set for the UPF 52 for PFCP connection. The IP segment A2 is an IP segment including the UPF 52. The first transmission unit 111 of the on-premise-side construction device 11 transmits the on-premise-side setting information to the cloud-side construction device 12 via the Internet 63. The first transmission unit 111 can acquire the IP address of the UPF 52 for the PFCP connection from the UPF 52. Further, the address band information of the IP segment A2 is registered in the on-premise-side construction device 11.

The second reception unit 122 of the cloud-side construction device 12 receives the on-premise-side setting information. The second setting unit 123 transfers the on-premise-side setting information to the SMF 42. The SMF 42 generates the SMF-GW 44 in the IP segment G2. The SMF 42 generates the SMF-GW 44 by a virtual technique. The SMF 42 generates the SMF-GW 44 by generating, for example, a virtual server, Pod, a container, and the like. Further, the SMF 42 transfers the on-premise-side setting information to the SMF-GW 44. The SMF-GW 44 registers the address band information of the IP segment A2 as a transmission destination of an IP packet for the UPF 52. Further, the SMF-GW 44 registers the IP address of the UPF 52 for the PFCP connection as an IP address to be used for establishing the PFCP association.

Further, the cloud-side setting information is address band information of the IP segment G2. The IP segment G2 is an IP segment including the SMF-GW 44. The second transmission unit 121 of the cloud-side construction device 12 transmits the cloud-side setting information to the on-premise-side construction device 11 via the Internet 63.

The first reception unit 112 of the on-premise-side construction device 11 receives the cloud-side setting information. The first setting unit 113 transfers the cloud-side setting information to the UPF 52. The UPF 52 registers the address band information of the IP segment G2 as a transmission destination of an IP packet for the SMF 42.

In this way, connection between the SMF-GW 44 and the UPF 52 can be achieved. Further, establishment of the PFCP association between the SMF 42 and the UPF 52 can be achieved.

Next, a case where the cloud-side setting information and the on-premise-side setting information are setting information about connection between the RAN 51 and the AMF 41. In this case, the on-premise device 50 is the RAN 51. Further, the cloud device 40 is the AMF 41. In this case, the cloud-side setting information is set in the on-premise device 50 and the on-premise-side setting information is set in the cloud device 40, and thus an SCTP association between the RAN 51 and the AMF 41 can be established.

Note that, in this case, it is assumed that the VPN connection between the VPN router 47 and the VPN router 54 is established.

In this case, the on-premise-side setting information includes address band information of the IP segment A2, and an IP address being set for the RAN 51 for SCTP connection. The IP segment A2 is an IP segment including the RAN 51. The first transmission unit 111 of the on-premise-side construction device 11 transmits the on-premise-side setting information to the cloud-side construction device 12 via the Internet 63. The first transmission unit 111 can acquire the IP address for the SCTP connection being set for RAN 51 from the RAN 51. Further, the address band information of the IP segment A2 is registered in the on-premise-side construction device 11 in advance.

The second reception unit 122 of the cloud-side construction device 12 receives the on-premise-side setting information. Further, the second setting unit 123 transfers the on-premise-side setting information to the AMF 41. The AMF 41 generates the AMF-GW 43 in the IP segment G2.

The AMF 41 generates the AMF-GW 43 by a virtual technique. The AMF 41 generates the AMF-GW 43 by generating, for example, a virtual server, Pod, a container, and the like.

Further, the AMF 41 transfers the on-premise-side setting information to the AMF-GW 43. The AMF-GW 43 registers the address band information of the IP segment A2 as a transmission destination of an IP packet for the RAN 51. Further, the AMF-GW 43 registers the IP address of the RAN 51 for the SCTP connection as an IP address to be used for establishing the SCTP association.

Further, the cloud-side setting information includes address band information of the IP segment G2, and an IP address being set for the AMF-GW 43 for the SCTP connection. The IP segment G2 is an IP segment including the AMF-GW 43. The second transmission unit 121 of the cloud-side construction device 12 transmits the cloud-side setting information to the on-premise-side construction device 11 via the Internet 63. The second transmission unit 121 can acquire the IP address of the AMF-GW 43 for the SCTP connection from the AMF 41. The AMF 41 can acquire the IP address for the SCTP connection from the AMF-GW 43. Further, the address band information of the IP segment G2 is registered in the cloud-side construction device 12 in advance.

The first reception unit 112 of the on-premise-side construction device 11 receives the cloud-side setting information. Further, the first setting unit 113 transfers the cloud-side setting information to the RAN 51. The RAN 51 registers the address band information of the IP segment G2 as a transmission destination of an IP packet for the AMF 41. Further, the RAN 51 registers the IP address of the AMF-GW 43 for the SCTP connection as an IP address to be used for establishing the SCTP association.

In this way, connection between the AMF-GW 43 and the RAN 51 can be achieved. Further, establishment of the SCTP association between the AMF-GW 43 and the RAN 51 can be achieved.

Next, a case where the on-premise-side construction device 11 and the cloud-side construction device 12 are used for assigning an IP address to UE will be described. The IP address to be assigned herein is an IP address used by the UE when the UE is connected to the DN 55.

Note that, in this case, it is assumed that the VPN connection between the VPN router 47 and the VPN router 54 and the connection between the AMF 41 and the RAN 51 are established.

The first transmission unit 111 of the on-premise-side construction device 11 transmits, to the cloud-side construction device 12, the address band information of the IP segment A1, and an IP address list of terminals connected to the DN 55. The IP segment A1 is an IP segment including the DN 55. Note that a terminal herein is, for example, a server and the like connected to the DN 55, and is different from the UE. The first transmission unit 111 can acquire the IP address list of the terminals connected to the DN 55 from the DN 55. Further, the address band information of the IP segment A1 is registered in the on-premise-side construction device 11.

The second reception unit 122 of the cloud-side construction device 12 receives the address band information of the IP segment A1, and the IP address list of the terminals connected to the DN 55. The second setting unit 123 of the cloud-side construction device 12 transfers, to the SMF 42, the address band information of the IP segment A1, and the IP address list of the terminals connected to the DN 55.

The SMF 42 holds the address band information of the IP segment A1, and the IP address list of the terminals connected to the DN 55.

When a procedure for establishing a protocol data unit (PDU) session starts by the UE, the SMF 42 decides the IP address to be assigned to the UE from an address band of the IP segment A1. The SMF 42 decides, as the IP address to be assigned to the UE, an IP address that does not overlap an IP address present in the IP address list of the terminals connected to the DN 55. The IP address decided by the SMF 42 is notified to the UE via the AMF 41, the AMF-GW 43, and the RAN 51. Then, the UE establishes the PDU session by using the assigned IP address. In this way, the UE can be connected to the DN 55.

Note that there is a possibility that a plurality of pieces of UE are connected to the DN 55. Thus, the SMF 42 may decide, as the IP address to be assigned to the UE, an IP address that is not present in any of the IP address list of the terminals and a UE address list. Note that the UE address list is a list of IP addresses assigned to the UE. In this case, the SMF 42 holds the UE address list. Further, when the SMF 42 decides the IP address to be assigned to the UE, the SMF 42 updates the UE address list.

The case where a C-Plane device associated with one on-premise environment 61 is constructed has been described so far. However, one cloud environment 62 can also be assigned to a plurality of on-premise environments 61-*i* (i is an integer from 1 to N).

Figure 6:
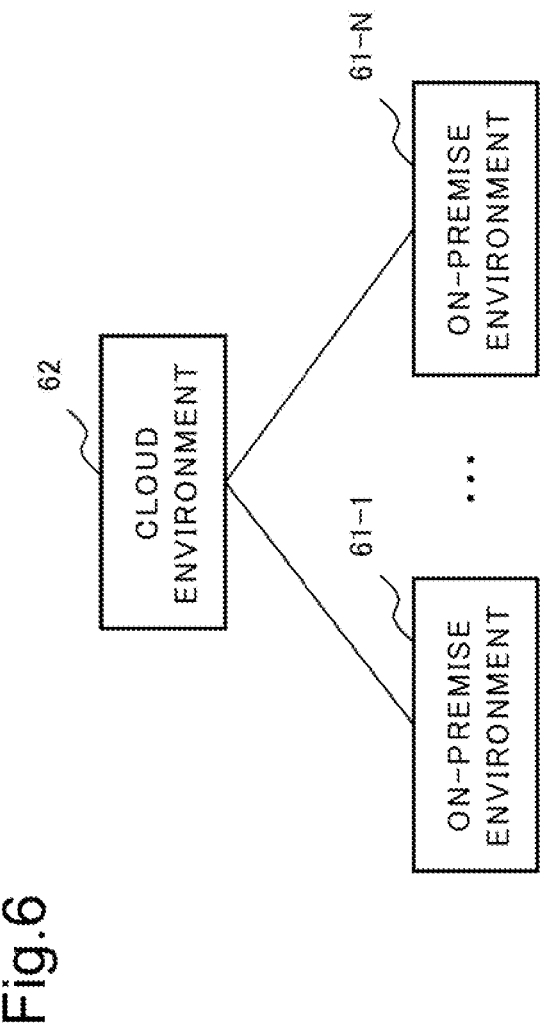
FIG. 6 is a diagram illustrating a connection example of the cloud environment and the on-premise environment according to the second example embodiment of the present invention.

FIG. 6 illustrates a connection example of the plurality of on-premise environments 61-*i* and the cloud environment 62. As in FIG. 6, the cloud environment 62 can accommodate C-Plane devices associated with the plurality of on-premise environments 61-*i*.

Figure 7:
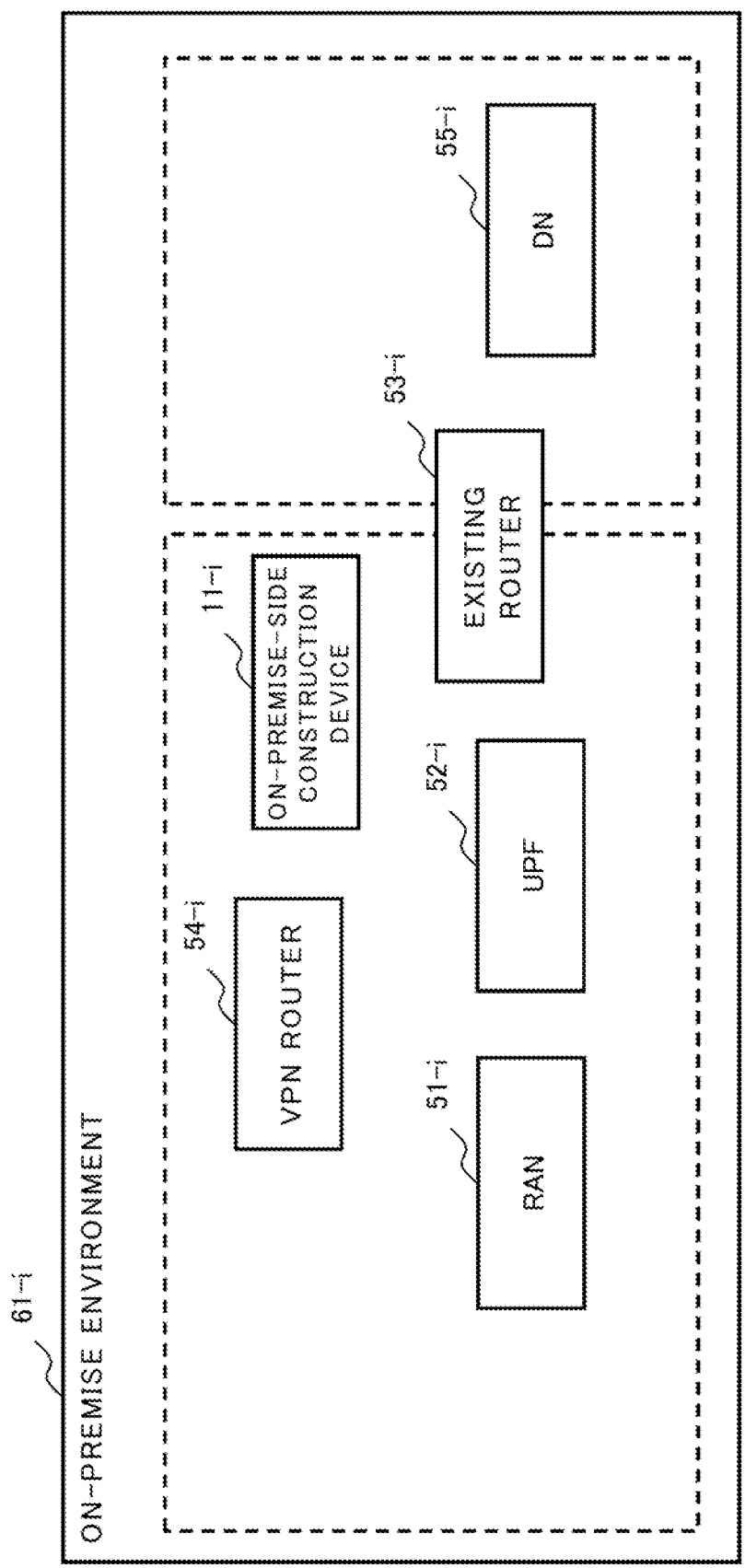
FIG. 7 is a diagram illustrating a configuration example of the on-premise environment according to the second example embodiment of the present invention.

FIG. 7 illustrates a configuration example of the on-premise environment 61-*i*. The configuration example of the on-premise environment 61-*i* is similar to the configuration example (FIG. 4) of the on-premise environment 61.

Figure 8:
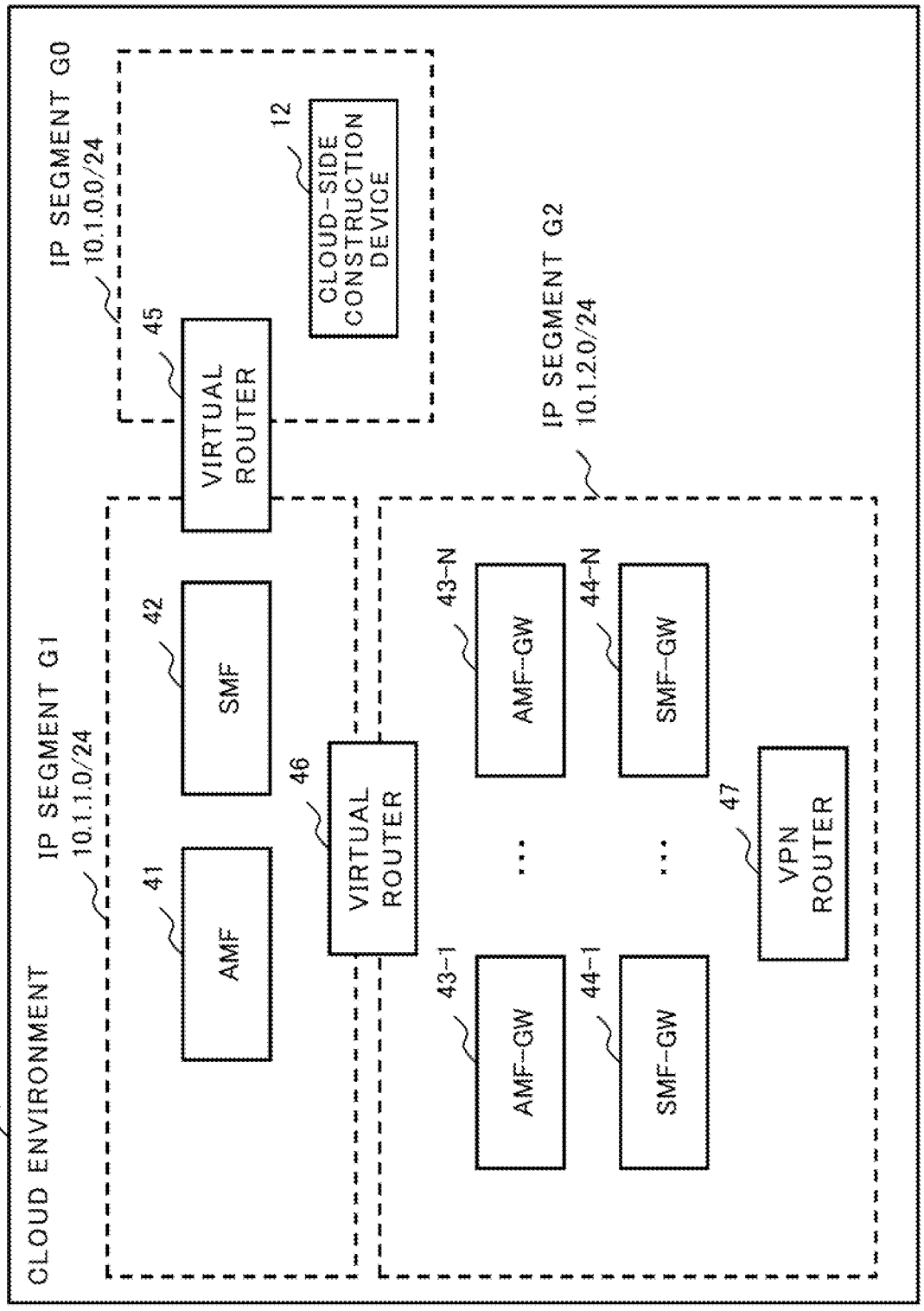
FIG. 8 is a diagram illustrating a configuration example of the cloud environment according to the second example embodiment of the present invention.

FIG. 8 illustrates a configuration example of the cloud environment 62. The cloud environment 62 in FIG. 8 accommodates C-Plane devices associated with the plurality of on-premise environments 61-*i*. In the example in FIG. 8, a plurality of AMF-GWs 43-*i* and a plurality of SMF-GWs 44-*i* are generated in the IP segment G2. The AMF-GW 43-*i* and the SMF-GW 44-*i* are associated with the on-premise environment 61-*i*.

Figure 9:
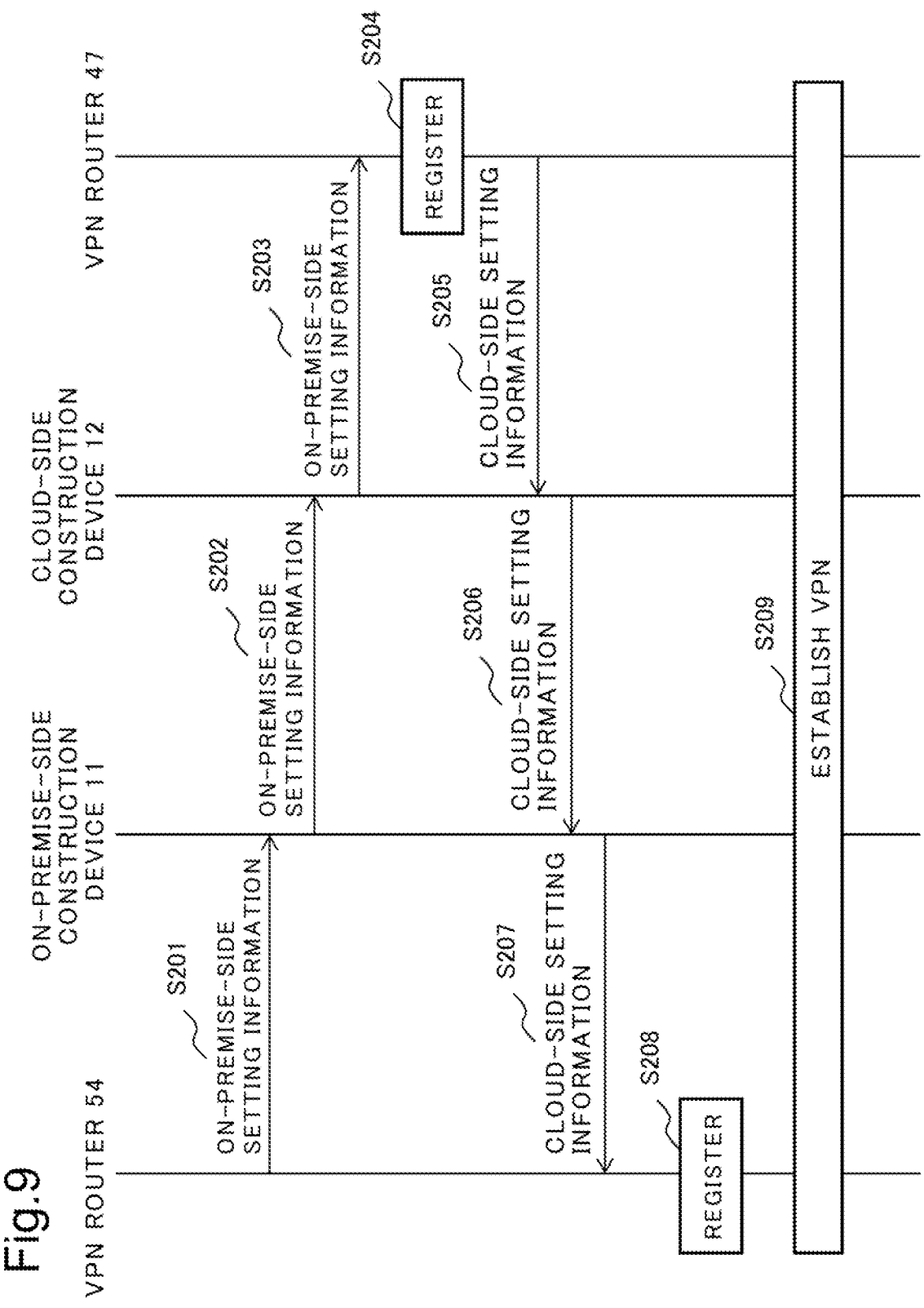
FIG. 9 is a diagram illustrating an example of an operation flow of a communication system according to the second example embodiment of the present invention.
Figure 10:
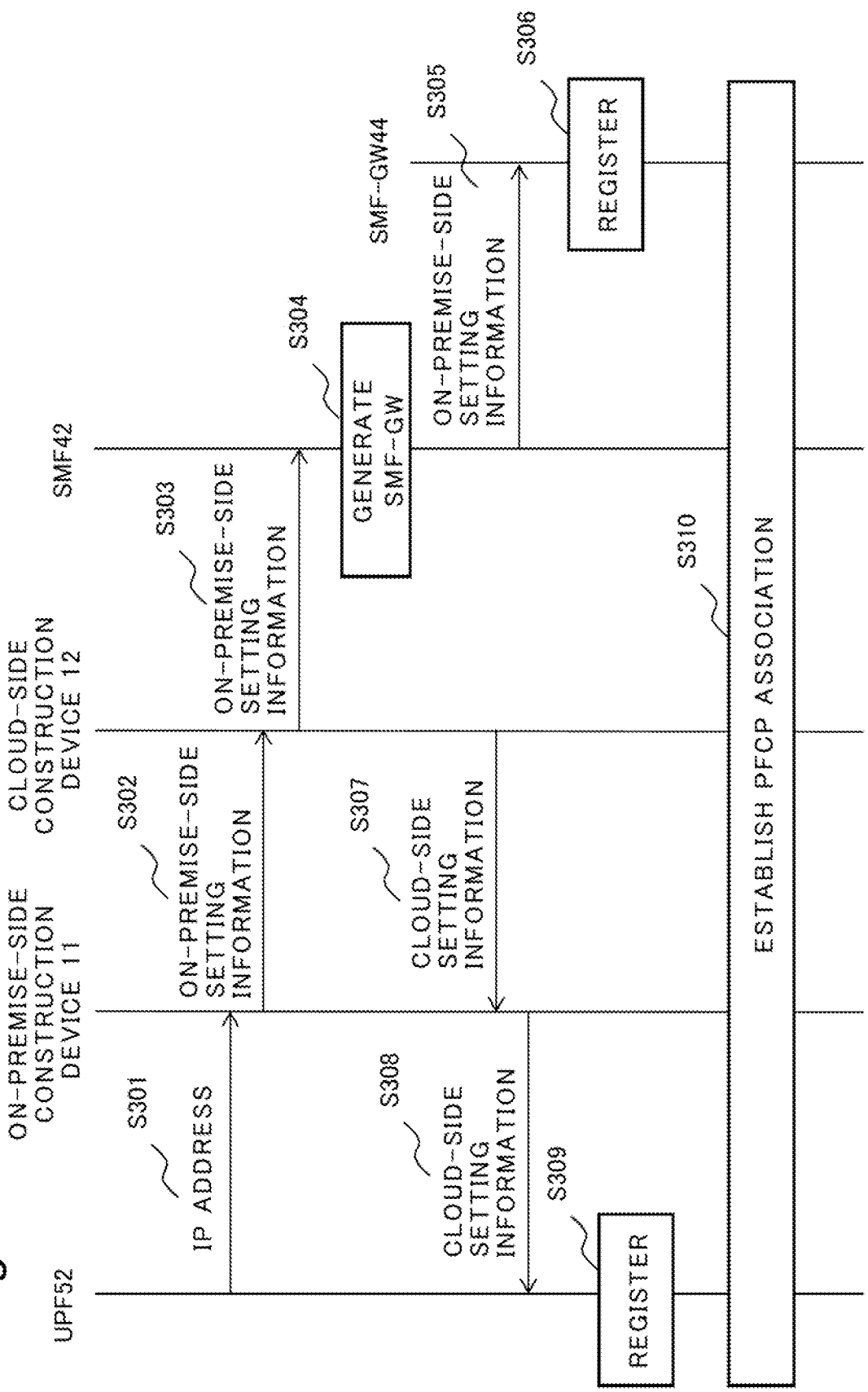
FIG. 10 is a diagram illustrating an example of an operation flow of the communication system according to the second example embodiment of the present invention.
Figure 11:
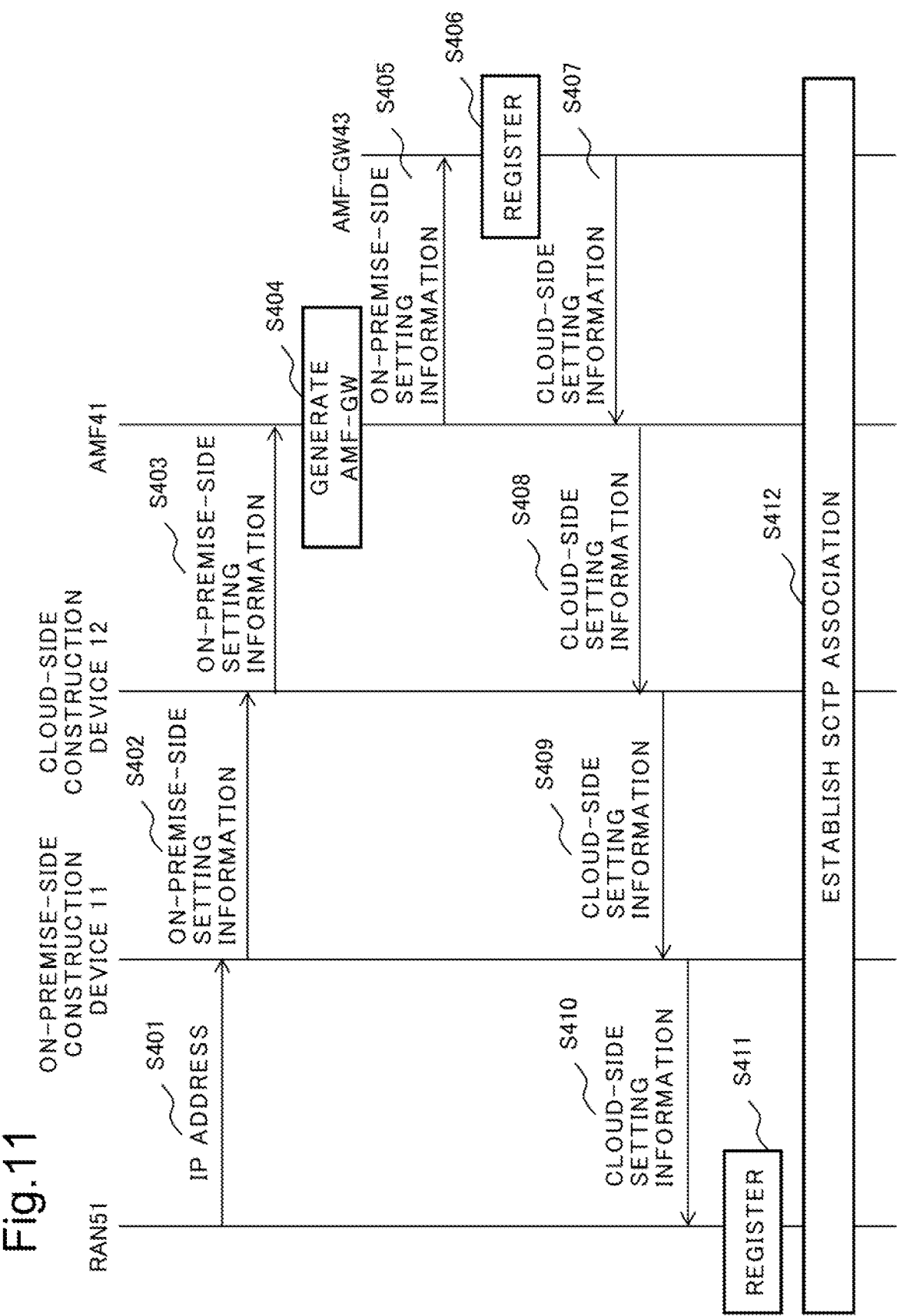
FIG. 11 is a diagram illustrating an example of an operation flow of the communication system according to the second example embodiment of the present invention.
Figure 12:
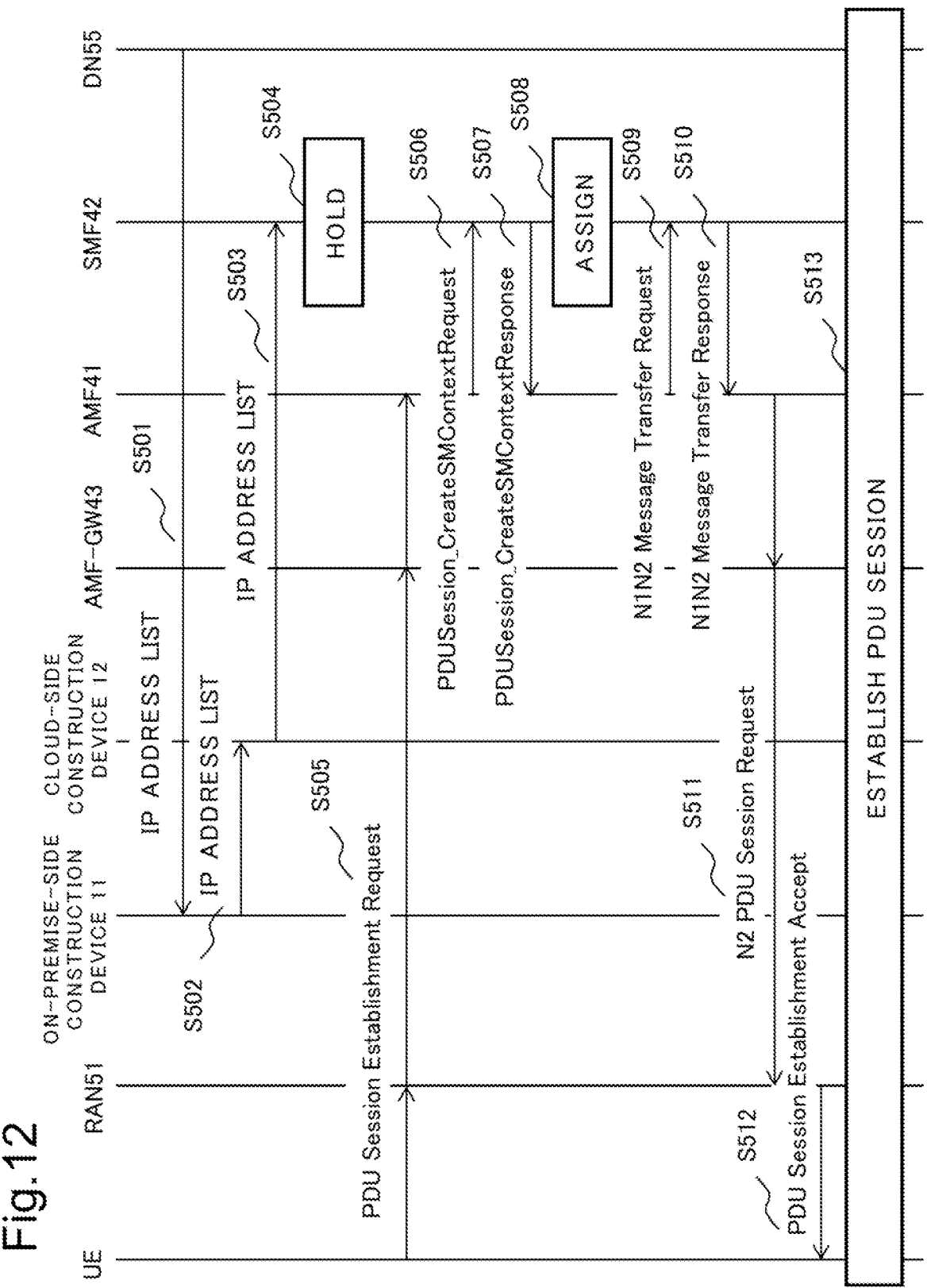
FIG. 12 is a diagram illustrating an example of an operation flow of the communication system according to the second example embodiment of the present invention.

Next, an example of an operation flow of the on-premise-side construction device 11 and the cloud-side construction device 12 will be described by using FIGS. 9 to 12. FIG. 9 is an example of an operation flow of the VPN connection. FIG. 10 is an example of an operation flow of the connection between the UPF 52 and the SMF 42. FIG. 11 is an example of an operation flow of the connection between the RAN 51 and the AMF 41. FIG. 12 is an example of an operation flow of assignment of an IP address to UE. The on-premise-side construction device 11 and the cloud-side construction device 12 operate in order of FIGS. 9, 10, 11, and 12.

First, the example of the operation flow of the VPN connection between the on-premise-side construction device 11 and the cloud-side construction device 12 will be described by using FIG. 9.

In this case, the on-premise device 50 is the VPN router 54. Further, the cloud device 40 is the VPN router 47. Further, on-premise-side setting information is information for the VPN router 47 to be connected to the VPN router 54. The on-premise-side setting information is, for example, an IP address of the VPN router 54. Further, cloud-side setting information is information for the VPN router 54 to be connected to the VPN router 47. The cloud-side setting information is, for example, an IP address of the VPN router 47.

First, the first transmission unit 111 of the on-premise-side construction device 11 acquires the on-premise-side setting information from the VPN router 54 (step S201). The first transmission unit 111 transmits the on-premise-side setting information to the cloud-side construction device 12 via the Internet 63 (step S202). Step S201 corresponds to step S101 in FIG. 2. Note that the first transmission unit 111 of the on-premise-side construction device 11 starts step S201 when a start request is input and the like. An input method of the start request is not particularly limited. The start request may be input from an operator terminal (not illustrated), for example. Further, the start request may be input from an operation switch and the like included in the on-premise-side construction device 11.

When the second reception unit 122 of the cloud-side construction device 12 receives the on-premise-side setting information, the second setting unit 123 transmits the on-premise-side setting information to the VPN router 47 (step S203). Then, the VPN router 47 registers the on-premise-side setting information (such as the IP address of the VPN router 54) as a connection destination for the on-premise environment 61 (step S204). Step S203 and step S204 correspond to step S102 in FIG. 2.

Further, the second transmission unit 121 of the cloud-side construction device 12 acquires the cloud-side setting information from the VPN router 47 (step S205). Further, the second transmission unit 121 transmits the cloud-side setting information to the on-premise-side construction device 11 via the Internet 63 (step S206). Step S206 corresponds to step S103 in FIG. 3.

When the first reception unit 112 of the on-premise-side construction device 11 receives the cloud-side setting information, the first setting unit 113 of the on-premise-side construction device 11 transfers the cloud-side setting information to the VPN router 54 (step S207). The VPN router 54 registers the cloud-side setting information as a connection destination for the cloud environment 62 (step S208). Step S207 and step S208 correspond to step S104 in FIG. 3.

Then, the VPN router 54 and the VPN router 47 establish the VPN (step S209).

Next, the operation flow of the connection between the UPF 52 and the SMF 42 will be described by using FIG. 10.

In this case, the on-premise device 50 is the UPF 52. Further, the cloud device 40 is the SMF 42. Further, the on-premise-side setting information includes address band information of the IP segment A2, and an IP address being set for the UPF 52 for PFCP connection. Further, the address band information of the IP segment A2 is registered in the on-premise-side construction device 11. Further, the cloud-side setting information is address band information of the IP segment G2.

The first transmission unit 111 of the on-premise-side construction device 11 acquires the IP address of the UPF 52 for the PFCP from the UPF 52 (step S301). The first transmission unit 111 transmits the on-premise-side setting information to the cloud-side construction device 12 (step S302). Step S302 corresponds to step S101 in FIG. 2.

When the second reception unit 122 of the cloud-side construction device 12 receives the on-premise-side setting information, the second setting unit 123 transfers the on-premise-side setting information to the SMF 42 (step S303). The SMF 42 generates the SMF-GW 44 in the IP segment G2 (step S304). Further, the SMF 42 transfers the on-premise-side setting information to the SMF-GW 44 (step S305). The SMF-GW 44 registers the address band information of the IP segment A2 as a transmission destination of an IP packet for the UPF 52. Further, the SMF-GW 44 registers the IP address of the UPF 52 for the PFCP as an IP address to be used for establishing a PFCP association (step S306). Step S303 to step S306 correspond to step S102 in FIG. 2.

The second transmission unit 121 of the cloud-side construction device 12 transmits the cloud-side setting information to the on-premise-side construction device 11 (step S307). Step S307 corresponds to step S103 in FIG. 3.

Note that the second transmission unit 121 performs transmission of the cloud-side setting information after step S302. Note that, step S310 needs to be performed after both of step S306 and step S309 are completed. Thus, for example, the second transmission unit 121 may wait for a predetermined period of time after step S302, and then perform step S307 in such a way that completion of step S309 is after completion of step S306. Then, the UPF 52 performs step S310 after completion of step S309. Further, for example, the SMF-GW 44 may transmit a completion notification to the SMF 42 after completion of step S306. Then, after the SMF 42 transmits a completion notification to the cloud-side construction device 12 and the cloud-side construction device 12 receives the completion notification, the second transmission unit 121 may perform step S307.

When the first reception unit 112 of the on-premise-side construction device 11 receives the cloud-side setting information, the first setting unit 113 transfers the cloud-side setting information to the UPF 52 (step S308). The UPF 52 registers the address band information of the IP segment G2 as a transmission destination of an IP packet for the SMF 42 (step S309). Step S308 and step S309 correspond to step S104 in FIG. 3.

Then, the SMF 42 and the UPF 52 establish the PFCP association (step S310).

Next, the example of the operation flow of the connection between the RAN 51 and the AMF 41 will be described by using FIG. 11.

In this case, the on-premise device 50 is the RAN 51. Further, the cloud device 40 is the AMF 41. Further, the on-premise-side setting information includes an IP address being set for the RAN 51 for SCTP connection, and address band information of the IP segment A2. Further, the cloud-side setting information includes address band information of the IP segment G2, and an IP address being set for the AMF-GW 43 for the SCTP connection. Further, the address band information of the IP segment A2 is registered in the on-premise-side construction device 11 in advance. Further, the address band information of the IP segment G2 is registered in the cloud-side construction device 12 in advance.

The first transmission unit 111 of the on-premise-side construction device 11 acquires the IP address being set for the RAN 51 from the RAN 51 (step S401). The first transmission unit 111 transmits the on-premise-side setting information to the cloud-side construction device 12 (step S402). Step S402 corresponds to step S101 in FIG. 2.

When the second reception unit 122 of the cloud-side construction device 12 receives the on-premise-side setting information, the second setting unit 123 transfers the on-premise-side setting information to the AMF 41 (step S403). The AMF 41 generates the AMF-GW 43 in the IP segment G2 (step S404). Further, the AMF 41 transfers the on-premise-side setting information to the AMF-GW 43 (step S405). The AMF-GW 43 registers the address band information of the IP segment A2 as a transmission destination of an IP packet for the RAN 51. Further, the AMF-GW 43 registers the IP address of the RAN 51 for the SCTP connection as an IP address to be used for establishing the SCTP association (step S406). Step S403 to step S406 correspond to step S102 in FIG. 2.

The AMF-GW 43 notifies the IP address being set for the AMF-GW 43 for the SCTP connection to the AMF 41 (step S407). The AMF 41 transmits the IP address of the AMF-GW 43 for the SCTP connection to the cloud-side construction device 12 (step S408). The second transmission unit 121 of the cloud-side construction device 12 transmits the cloud-side setting information to the on-premise-side construction device 11 (step S409). Step S409 corresponds to step S103 in FIG. 3.

When the first reception unit 112 of the on-premise-side construction device 11 receives the cloud-side setting information, the first setting unit 113 transfers the cloud-side setting information to the RAN 51 (step S410). The RAN 51 registers the address band information of the IP segment G2 as a transmission destination of an IP packet for the AMF 41. Further, the RAN 51 registers the IP address of the AMF-GW 43 for the SCTP connection as an IP address to be used for establishing the SCTP association (step S411). Step S410 and step S411 correspond to step S104 in FIG. 3.

Then, the AMF 41 and the RAN 51 establish the SCTP association (step S412).

Next, assignment of an IP address to UE will be described by using FIG. 12. The IP address to be assigned herein is an IP address used by the UE when the UE is connected to the DN 55.

The first transmission unit 111 of the on-premise-side construction device 11 acquires an IP address list of terminals connected to the DN 55 from the DN 55 (step S501). The first transmission unit 111 transmits, to the cloud-side construction device 12, address band information of the IP segment A1, and the IP address list of the terminals connected to the DN 55 (step S502). Note that a terminal herein is, for example, a server and the like connected to the DN 55, and is different from the UE. Further, the address band information of the IP segment A1 is registered in the on-premise-side construction device 11.

The second reception unit 122 of the cloud-side construction device 12 receives the address band information of the IP segment A1, and the IP address list of the terminals connected to the DN 55. The second setting unit 123 of the cloud-side construction device 12 transfers, to the SMF 42, the address band information of the IP segment A1, and the IP address list of the terminals connected to the DN 55 (step S503).

The SMF 42 holds the address band information of the IP segment A1, and the IP address list of the terminals connected to the DN 55 (step S504).

When a procedure for establishing a PDU session starts by the UE (step S505 to step S507), the SMF 42 decides the IP address to be assigned to the UE from an address band of the IP segment A1 (step S508). The SMF 42 decides, as the IP address to be assigned to the UE, an IP address that does not overlap an IP address present in the IP address list of the terminals connected to the DN 55. The IP address decided by the SMF 42 is notified to the UE via the AMF 41, the AMF-GW 43, and the RAN 51 (step S510 to step S512). Then, the UE establishes the PDU session by using the assigned IP address (step S513). In this way, the UE can be connected to the DN 55.

As described above, in the second example embodiment of the present invention, the communication system 10 includes the on-premise-side construction device 11 and the cloud-side construction device 12. The cloud-side construction device 12 is included in the cloud environment 62. The cloud environment 62 includes the cloud device 40. The on-premise-side construction device 11 is included in the on-premise environment 61. The on-premise environment 61 includes the on-premise device 50. The cloud device 40 and the on-premise device 50 are communication devices constituting a core network. The cloud-side construction device 12 and the on-premise-side construction device 11 are connected to each other via the Internet 63. The on-premise-side construction device 11 includes the first transmission unit 111, the first reception unit 112, and the first setting unit 113. The first transmission unit 111 transmits on-premise-side setting information to the cloud-side construction device 12. The on-premise-side setting information is information for the cloud device 40 to communicate with the on-premise device 50. The first reception unit 112 receives cloud-side setting information from the cloud-side construction device 12. The cloud-side setting information is information for the on-premise device 50 to communicate with the cloud device 40. The first setting unit 113 sets the cloud-side setting information in the on-premise device 50. The cloud-side construction device 12 includes the second transmission unit 121, the second reception unit 122, and the second setting unit 123. The second transmission unit 121 transmits the cloud-side setting information to the on-premise-side construction device 11. The second reception unit 122 receives the on-premise-side setting information from the on-premise-side construction device 11. The second setting unit 123 sets the on-premise-side setting information in the cloud device 40.

In this way, in the communication system 10, the on-premise-side construction device 11 and the cloud-side construction device 12 are connected to each other via the Internet. Then, the on-premise-side construction device 11 transmits the on-premise-side setting information to the cloud-side construction device 12, and the cloud-side construction device 12 sets the on-premise-side setting information in the cloud device 40. Further, the cloud-side construction device 12 transmits the cloud-side setting information to the on-premise-side construction device 11, and the on-premise-side construction device 11 sets the cloud-side setting information in the on-premise device 50. The on-premise-side setting information is set in the cloud device 40, and thus a cloud environment is constructed. Thus, when a communication device is placed in the cloud environment and an on-premise environment, construction of the cloud environment according to the on-premise environment can be quickly performed.

Further, the on-premise device 50 may be the UPF 52, and the cloud device 40 may be the SMF 42. In this case, the second setting unit 123 of the cloud-side construction device 12 transmits the on-premise-side setting information to the SMF 42. Further, the SMF 42 generates the SMF-GW 44 that connects the SMF 42 and the UPF 52. Further, the first setting unit 113 of the on-premise-side construction device 11 transmits the cloud-side setting information to the UPF 52. Further, the SMF 42 and the UPF 52 establish a PFCP association by using the on-premise-side setting information and the cloud-side setting information. In this way, a C-Plane can be constructed according to a configuration of a U-Plane, and establishment of the PFCP association can also be achieved.

Further, in this case, on-premise-side setting information includes address band information of an IP segment including the UPF 52, and an IP address being set for the UPF 52 for PFCP connection. Further, cloud-side setting information includes address band information of an IP segment including the SMF-GW 44. In this way, the C-Plane can be constructed according to an IP network configuration of the U-Plane.

Further, the on-premise-side construction device 11 may be the RAN 51, and the cloud-side construction device 12 may be the AMF 41. In this case, the second setting unit 123 of the cloud-side construction device 12 transmits the on-premise-side setting information to the AMF 41. Further, the AMF 41 generates the AMF-GW 43 that connects the AMF 41 and the RAN 51. Further, the first setting unit 113 of the on-premise-side construction device 11 transmits the cloud-side setting information to the RAN 51. Further, the AMF 41 and the RAN 51 establish an SCTP association by using the on-premise-side setting information and the cloud-side setting information. In this way, a C-Plane can be constructed according to a configuration of a U-Plane, and establishment of the SCTP association can also be achieved.

Further, in this case, on-premise-side setting information includes address band information of an IP segment including the RAN 51, and an IP address being set for the RAN 51 for SCTP connection. Further, cloud-side setting information includes address band information of an IP segment including the AMF-GW 43, and an IP address being set for the AMF-GW 43 for the SCTP connection. In this way, the C-Plane can be constructed according to an IP network configuration of the U-Plane.

Further, the on-premise environment may further include the DN 55. In this case, the first transmission unit 111 of the on-premise-side construction device 11 transmits, to the cloud-side construction device 12, address band information of an IP segment including the DN 55, and an IP address list of terminals connected to the DN 55. Further, the second setting unit 123 of the cloud-side construction device 12 transmits, to the SMF 42, the address band information of the IP segment including the DN 55, and the IP address list of the terminals connected to the DN 55. Further, the SMF 42 decides, as an IP address to be assigned to UE, an IP address not included in the IP address list from an address band of the IP segment including the DN 55. Further, the AMF 41 transmits the decided IP address to the UE via the RAN 51. In this way, the UE can be connected to the DN 55.

Further, the on-premise device 50 may be the VPN router 54 included in the on-premise environment 61. Further, the cloud device 40 may be the VPN router 47 included in the cloud environment 62. In this case, the VPN router 54 included in the on-premise environment 61 and the VPN router 47 included in the cloud environment 62 establish VPN connection by using on-premise-side setting information and cloud-side setting information. In this way, a C-Plane can be constructed according to a configuration of a U-Plane, and the VPN connection between the U-Plane and the C-Plane can also be achieved.

Further, in this case, the on-premise-side setting information includes an IP address of the VPN router 54 included in the on-premise environment 61. Further, the cloud-side setting information includes an IP address of the VPN router 47 included in the cloud environment 62. In this way, the C-Plane can be constructed according to an IP network configuration of the U-Plane.

[Hardware Configuration Example]

A configuration example of a hardware source that achieves the communication system (10) according to each of the example embodiments of the present invention described above by using one information processing device (computer) will be described. Note that the communication system may be achieved by physically or functionally using at least two information processing devices. Further, the communication system may be achieved as a dedicated device. Further, only a part of a function of the communication system may be achieved by using the information processing device.

Figure 13:
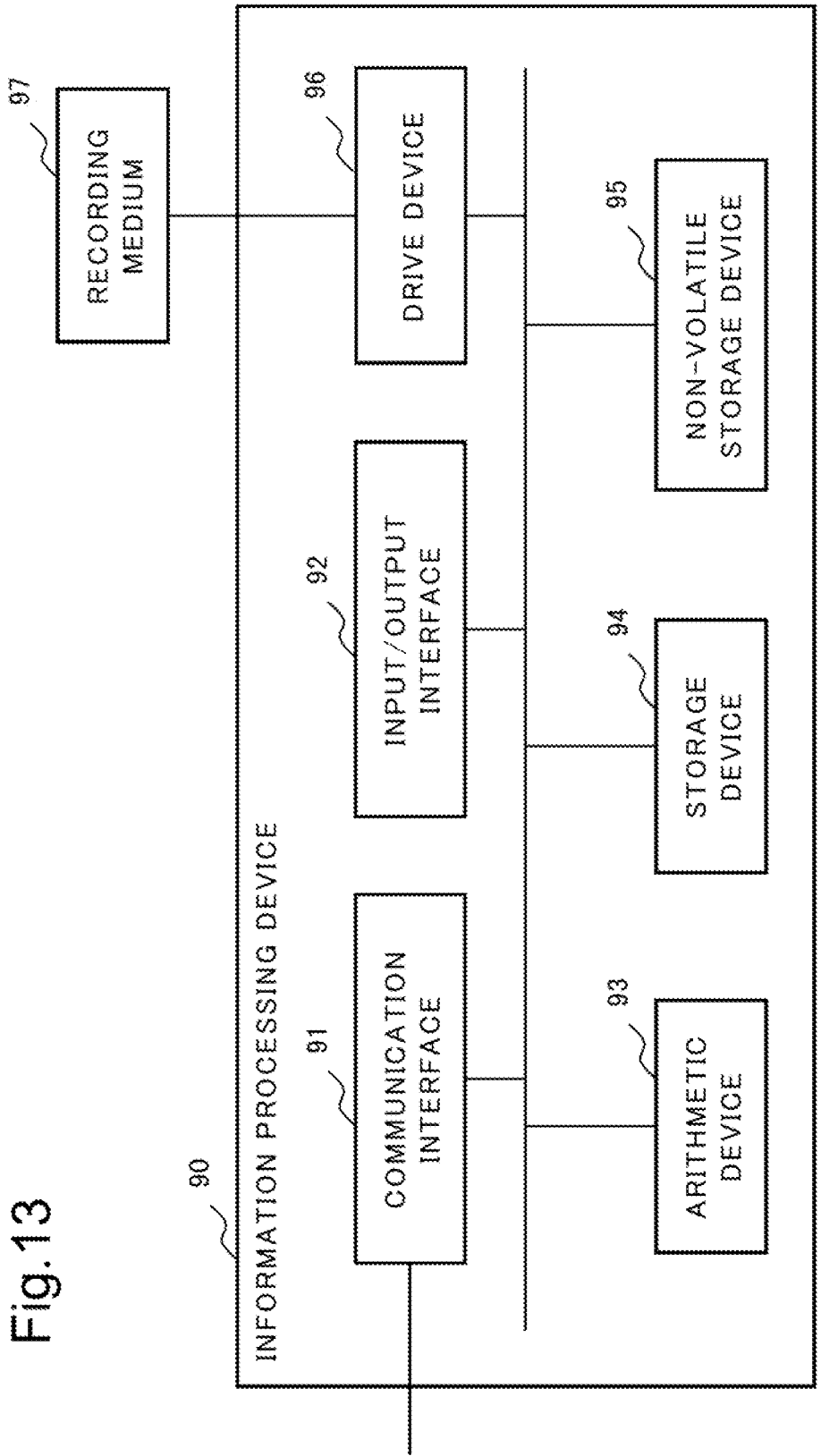
FIG. 13 is a diagram illustrating a hardware configuration example of each of the example embodiments of the present invention.

FIG. 13 is a diagram schematically illustrating a hardware configuration example of an information processing device that can achieve the communication system according to each of the example embodiments of the present invention. An information processing device 90 includes a communication interface 91, an input/output interface 92, an arithmetic device 93, a storage device 94, a non-volatile storage device 95, and a drive device 96.

For example, the on-premise-side construction device 11 and the cloud-side construction device 12 in FIG. 1 can be achieved by the communication interface 91 and the arithmetic device 93.

The communication interface 91 is a communication means for allowing the communication system according to each of the example embodiments to communicate with an external device in a wired and/or wireless manner. Note that, when the communication system is achieved by using at least two information processing devices, the communication system may be connected in such a way as to perform communication between the information processing devices with each other via the communication interface 91.

The input/output interface 92 is a man-machine interface, such as a keyboard being one example of an input device and a display as an output device.

The arithmetic device 93 is an arithmetic processing device, such as a general-purpose central processing unit (CPU) and a microprocessor, and a plurality of electric circuits. For example, the arithmetic device 93 can read, in the storage device 94, various types of programs stored in the non-volatile storage device 95, and execute processing according to the read program.

The storage device 94 is a memory device, such as a random access memory (RAM), that can be referred from the arithmetic device 93, and stores a program, various types of data, and the like. The storage device 94 may be a volatile memory device.

The non-volatile storage device 95 is a non-volatile storage device such as a read only memory (ROM) and a flash memory, for example, and can store various types of programs, data, and the like.

For example, the drive device 96 is a device that processes reading and writing of data from and to a recording medium 97 described below.

The recording medium 97 is any recording medium that can record data, such as an optical disk, a magneto-optical disk, and a semiconductor flash memory, for example.

Each of the example embodiments of the present invention may be achieved by, for example, forming the communication system by the information processing device 90 illustrated in FIG. 13, and supplying, to the communication system, a program that can achieve the function described in each of the above-described example embodiments.

In this case, the example embodiment can be achieved by the arithmetic device 93 executing the program supplied to the communication system. Further, a part of the function instead of the entire communication system can also be formed of the information processing device 90.

Furthermore, the communication system may be formed in such a way that the above-described program is recorded in the recording medium 97 and the above-described program is appropriately stored in the non-volatile storage device 95 in a shipment stage, an operation stage, or the like of the communication system. Note that, in this case, as a method of supplying the above-described program, a method of installing the above-described program inside the communication system by using an appropriate jig in a manufacturing stage before shipment, an operation stage, or the like may be adopted. Further, as the method of supplying the above-described program, a general procedure of a method of downloading from the outside via a communication line such as the Internet and the like may be adopted.

The whole or part of the example embodiments disclosed above can be described as, but not limited to, the following supplementary notes.

(Supplementary Note 1)

A communication system including:

a cloud-side construction device included in a cloud environment including a cloud device; and an on-premise-side construction device included in an on-premise environment including an on-premise device, and connected to the cloud-side construction device via the Internet, wherein the cloud device and the on-premise device are communication devices constituting a core network, the on-premise-side construction device includes a first transmission unit that transmits on-premise-side setting information for the cloud device to communicate with the on-premise device, to the cloud-side construction device via the Internet, a first reception unit that receives cloud-side setting information for the on-premise device to communicate with the cloud device, from the cloud-side construction device, and a first setting unit that sets the cloud-side setting information in the on-premise device, and the cloud-side construction device includes a second transmission unit that transmits the cloud-side setting information to the on-premise-side construction device via the Internet, a second reception unit that receives the on-premise-side setting information from the on-premise-side construction device, and a second setting unit that sets the on-premise-side setting information in the cloud device.

(Supplementary Note 2)

The communication system according to supplementary note 1, wherein the on-premise device is a device of a user plane, and the cloud device is a device of a control plane.

(Supplementary Note 3)

The communication system according to supplementary note 2, wherein the on-premise device is a user plane function (UPF), the cloud device is a session management function (SMF), the second setting unit transmits the on-premise-side setting information to the SMF, the SMF generates an SMF-gateway (GW) that connects the SMF and the UPF, the first setting unit transmits the cloud-side setting information to the UPF, and the SMF and the UPF establish a packet forwarding control protocol (PFCP) association by using the on-premise-side setting information and the cloud-side setting information.

(Supplementary Note 4)
 The communication system according to supplementary note 3, wherein
  the on-premise-side setting information includes address band information of an Internet protocol (IP) segment including the UPF, and an IP address being set to the UPF for PFCP connection, and
  the cloud-side setting information includes address band information of an IP segment including the SMF-GW.
(Supplementary Note 5)
 The communication system according to supplementary note 2, wherein
  the on-premise device is a radio access network (RAN),
  the cloud device is an access and mobility management function (AMF),
  the second setting unit transmits the on-premise-side setting information to the AMF,
  the AMF generates an AMF-GW that connects the AMF and the RAN,
  the first setting unit transmits the cloud-side setting information to the RAN, and
  the AMF and the RAN establish a stream control transmission protocol (SCTP) association by using the on-premise-side setting information and the cloud-side setting information.
(Supplementary Note 6)
 The communication system according to supplementary note 5, wherein
  the on-premise-side setting information includes address band information of an IP segment including the RAN, and an IP address being set to the RAN for SCTP connection, and
  the cloud-side setting information includes address band information of an IP segment including the AMF-GW, and an IP address being set to the AMF-GW for SCTP connection.
(Supplementary Note 7)
 The communication system according to supplementary note 5 or 6, wherein
  the on-premise environment further includes a data network (DN),
  the first transmission unit transmits, to the cloud-side construction device, address band information of an IP segment including the DN, and an IP address list of terminals connected to the DN,
  the second setting unit transmits, to an SMF, address band information of an IP segment including the DN, and an IP address list of terminals connected to the DN,
  the SMF decides, as an IP address to be assigned to user equipment (UE), an IP address not included in the IP address list, from an address band of an IP segment including the DN, and
  the AMF transmits a decided IP address to the UE via the RAN.
(Supplementary Note 8)
 The communication system according to supplementary note 2, wherein
  the on-premise device is a virtual private network (VPN) router included in the on-premise environment,
  the cloud device is a VPN router included in the cloud environment, and
  a VPN router included in the on-premise environment and a VPN router included in the cloud environment establish VPN connection by using the on-premise-side setting information and the cloud-side setting information.
(Supplementary Note 9)
 The communication system according to supplementary note 8, wherein
  the on-premise-side setting information includes an IP address of a VPN router included in the on-premise environment, and
  the cloud-side setting information includes an IP address of a VPN router included in the cloud environment.
(Supplementary Note 10)
 A construction method in a communication system including
  a cloud-side construction device included in a cloud environment including a cloud device, and
  an on-premise-side construction device included in an on-premise environment including an on-premise device, and connected to the cloud-side construction device via the Internet,
  the cloud device and the on-premise device being communication devices constituting a core network,
  the construction method including:
  transmitting, by the on-premise-side construction device, on-premise-side setting information for the cloud device to communicate with the on-premise device, to the cloud-side construction device via the Internet;
  receiving, by the cloud-side construction device, the on-premise-side setting information from the on-premise-side construction device, and setting, by the cloud-side construction device, the on-premise-side setting information in the cloud device;
  transmitting, by the cloud-side construction device, cloud-side setting information for the on-premise device to communicate with the cloud device to the on-premise-side construction device via the Internet; and
  receiving, by the on-premise-side construction device, the cloud-side setting information from the cloud-side construction device, and setting, by the on-premise-side construction device, the cloud-side setting information in the on-premise device.
(Supplementary Note 11)
 A non-transitory computer-readable recording medium in a communication system including
  a cloud-side construction device included in a cloud environment including a cloud device, and
  an on-premise-side construction device included in an on-premise environment including an on-premise device, and connected to the cloud-side construction device via the Internet,
  the cloud device and the on-premise device being communication devices constituting a core network,
  the non-transitory computer-readable recording medium recording a construction program that causes a computer to achieve:
  a first transmission function of transmitting, by the on-premise-side construction device, on-premise-side setting information for the cloud device to communicate with the on-premise device, to the cloud-side construction device via the Internet;
  a second reception function of receiving, by the cloud-side construction device, the on-premise-side setting information from the on-premise-side construction device;

a second setting function of setting, by the cloud-side construction device, the on-premise-side setting information in the cloud device;
a second transmission function of transmitting, by the cloud-side construction device, cloud-side setting information for the on-premise device to communicate with the cloud device, to the on-premise-side construction device via the Internet;
a first reception function of receiving, by the on-premise-side construction device, the cloud-side setting information from the cloud-side construction device; and
a first setting function of setting, by the on-premise-side construction device, the cloud-side setting information in the on-premise device.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:

1. A communication system comprising:
a cloud-side construction device included in a cloud environment including a cloud device; and
an on-premise-side construction device included in an on-premise environment including an on-premise device, and connected to the cloud-side construction device via the Internet, wherein
the cloud device and the on-premise device are communication devices constituting a core network,
the on-premise-side construction device includes one or more memories storing instructions and one or more processors configured to execute the instructions to:
    transmit on-premise-side setting information for the cloud device to communicate with the on-premise device, to the cloud-side construction device via the Internet;
    receive cloud-side setting information for the on-premise device to communicate with the cloud device, from the cloud-side construction device; and
    set the cloud-side setting information in the on-premise device,
the cloud-side construction device includes one or more memories storing instructions and one or more processors configured to execute the instructions to:
    transmit the cloud-side setting information to the on-premise-side construction device via the Internet;
    receive the on-premise-side setting information from the on-premise-side construction device; and
    set the on-premise-side setting information in the cloud device, and
a communication between the cloud device and the on-premise device is enabled by setting the cloud-side setting information in the on-premise device and setting the on-premise setting information in the cloud device.

2. The communication system according to claim 1, wherein
the on-premise device is a device of a user plane, and
the cloud device is a device of a control plane.

3. The communication system according to claim 2, wherein
the on-premise device is a user plane function (UPF),
the cloud device is a session management function (SMF),
the one or more processors included in the cloud-side construction device are configured to execute the instructions to transmit the on-premise-side setting information to the SMF,
the SMF generates an SMF-gateway (GW) that connects the SMF and the UPF,
the one or more processors included in the on-premise-side construction device are configured to execute the instructions to transmit the cloud-side setting information to the UPF, and
the SMF and the UPF establish a packet forwarding control protocol (PFCP) association by using the on-premise-side setting information and the cloud-side setting information.

4. The communication system according to claim 3, wherein
the on-premise-side setting information includes address band information of an Internet protocol (IP) segment including the UPF, and an IP address being set to the UPF for PFCP connection, and
the cloud-side setting information includes address band information of an IP segment including the SMF-GW.

5. The communication system according to claim 2, wherein
the on-premise device is a radio access network (RAN),
the cloud device is an access and mobility management function (AMF),
the one or more processors included in the cloud-side construction device are configured to execute the instructions to transmit the on-premise-side setting information to the AMF,
the AMF generates an AMF-GW that connects the AMF and the RAN,
the one or more processors included in the on-premise-side construction device are configured to execute the instructions to transmit the cloud-side setting information to the RAN, and
the AMF and the RAN establish a stream control transmission protocol (SCTP) association by using the on-premise-side setting information and the cloud-side setting information.

6. The communication system according to claim 5, wherein
the on-premise-side setting information includes address band information of an IP segment including the RAN, and an IP address being set to the RAN for SCTP connection, and
the cloud-side setting information includes address band information of an IP segment including the AMF-GW, and an IP address being set to the AMF-GW for SCTP connection.

7. The communication system according to claim 5, wherein
the on-premise environment further includes a data network (DN),
the one or more processors included in the on-premise-side construction device are configured to execute the instructions to transmit, to the cloud-side construction device, address band information of an IP segment including the DN, and an IP address list of terminals connected to the DN,
the one or more processors included in the cloud-side construction device are configured to execute the instructions to transmit, to an SMF, address band information of an IP segment including the DN, and an IP address list of terminals connected to the DN, the SMF decides, as an IP address to be assigned to user equipment (UE), an IP address not included in the IP address list, from an address band of an IP segment including the DN, and the AMF transmits a decided IP address to the UE via the RAN.

8. The communication system according to claim 2, wherein the on-premise device is a virtual private network (VPN) router included in the on-premise environment, the cloud device is a VPN router included in the cloud environment, and the VPN router included in the on-premise environment and the VPN router included in the cloud environment establish VPN connection by using the on-premise-side setting information and the cloud-side setting information.

9. A construction method performed by a communication system including:

a cloud-side construction device included in a cloud environment including a cloud device, and an on-premise-side construction device included in an on-premise environment including an on-premise device, and connected to the cloud-side construction device via the Internet, the cloud device and the on-premise device being communication devices constituting a core network, wherein the construction method comprises:

transmitting, by the on-premise-side construction device, on-premise-side setting information for the cloud device to communicate with the on-premise device, to the cloud-side construction device via the Internet;

receiving, by the cloud-side construction device, the on-premise-side setting information from the on-premise-side construction device, and setting, by the cloud-side construction device, the on-premise-side setting information in the cloud device;

transmitting, by the cloud-side construction device, cloud-side setting information for the on-premise device to communicate with the cloud device, to the on-premise-side construction device via the Internet; and receiving, by the on-premise-side construction device, the cloud-side setting information from the cloud-side construction device, and setting, by the on-premise-side construction device, the cloud-side setting information in the on-premise device, and a communication between the cloud device and the on-premise device is enabled by setting the cloud-side setting information in the on-premise device and setting the on-premise setting information in the cloud device.

10. A non-transitory computer-readable recording medium storing a program executable by a communication system to perform a processing, the communication system including:

a cloud-side construction device included in a cloud environment including a cloud device, and an on-premise-side construction device included in an on-premise environment including an on-premise device, and connected to the cloud-side construction device via the Internet, the cloud device and the on-premise device being communication devices constituting a core network, wherein wherein the processing comprises:

transmitting, by the on-premise-side construction device, on-premise-side setting information for the cloud device to communicate with the on-premise device, to the cloud-side construction device via the Internet;

receiving, by the cloud-side construction device, the on-premise-side setting information from the on-premise-side construction device;

setting, by the cloud-side construction device, the on-premise-side setting information in the cloud device;

transmitting, by the cloud-side construction device, cloud-side setting information for the on-premise device to communicate with the cloud device, to the on-premise-side construction device via the Internet;

receiving, by the on-premise-side construction device, the cloud-side setting information from the cloud-side construction device; and setting, by the on-premise-side construction device, the cloud-side setting information in the on-premise device, wherein a communication between the cloud device and the on-premise device is enabled by setting the cloud-side setting information in the on-premise device and setting the on-premise setting information in the cloud device.

\* \* \* \* \*